US009769876B2

(12) United States Patent
Bach et al.

(10) Patent No.: US 9,769,876 B2
(45) Date of Patent: Sep. 19, 2017

(54) HEATING CONTROL AND/OR REGULATION DEVICE

(71) Applicant: SIEMENS AKTIENGESELLSCHAFT, München (DE)

(72) Inventors: Christine Bach, Nuremberg (DE); Bernhard Schmidt, Nuremberg (DE); Reinhard Schneider, Bamberg (DE); Jürgen Stoll, Fuerth (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 39 days.

(21) Appl. No.: 14/630,349

(22) Filed: Feb. 24, 2015

(65) Prior Publication Data

US 2015/0250024 A1  Sep. 3, 2015

(30) Foreign Application Priority Data

Feb. 28, 2014 (DE) ........................ 10 2014 203 729

(51) Int. Cl.
  *H05B 1/02*  (2006.01)
  *G05D 23/19*  (2006.01)
  *H05B 3/00*  (2006.01)

(52) U.S. Cl.
  CPC ......... *H05B 1/0202* (2013.01); *G05D 23/193* (2013.01); *G05D 23/1934* (2013.01);
  (Continued)

(58) Field of Classification Search
  CPC .. H05B 1/0202; H05B 2203/032; H05B 1/02; H05B 1/023; G05D 23/193; G05D 23/1934
  (Continued)

(56) References Cited

U.S. PATENT DOCUMENTS 5,816,061 A * 10/1998 Lee ...................... F24F 11/0076
                                                                    236/51
7,041,941 B2 * 5/2006 Faries, Jr. ............. A61J 1/1475
                                                                    128/898

(Continued)

FOREIGN PATENT DOCUMENTS

DE    35 22 064 A1   1/1987
DE   195 29 313 A1   2/1997
(Continued)

OTHER PUBLICATIONS

German Office Action for Application No. 102014203729.8 mailed Dec. 2, 2014.

*Primary Examiner* — Mark Paschall
(74) *Attorney, Agent, or Firm* — Henry M. Feiereisen LLC

(57) ABSTRACT

Power outputs in a heating control and/or regulation device are each electrically connectable to a heating element, especially a radiant heater. A power input is able to be connected electrically to a power supply for the heating elements. A power distribution device is connected electrically on its input side to the power input and is connected electrically on its output side via a branch to each of the power outputs to supply the power outputs with electric power from the power supply. A switching element is disposed in each of the branches or between each of the power outputs and the heating elements. A control and/or regulation unit is configured such that it controls and/or regulates the switching state of the switching elements as a function of set values. An interface receiving set values has at least one additional connection to a temperature measurement device that measures actual values of temperature. The control and/or regulation unit is configured such that it acquires the actual values of the temperature from the temperature measurement device and additionally controls and/or regulates the switching state of the switching elements as a function of these actual values of the temperature.

20 Claims, 3 Drawing Sheets

(52) U.S. Cl.
CPC ........... *H05B 1/023* (2013.01); *H05B 3/0019* (2013.01); *H05B 3/0038* (2013.01); *H05B 2203/032* (2013.01)

(58) Field of Classification Search
USPC ......... 219/494, 497, 506, 483–486, 507–509
See application file for complete search history.

(56) References Cited

U.S. PATENT DOCUMENTS

| | | | | |
|---|---|---|---|---|
| 9,031,440 | B2* | 5/2015 | Fujiwara | G03G 15/2039 219/494 |
| 9,345,067 | B2* | 5/2016 | Biller | H05B 1/0227 |
| 2003/0178412 | A1* | 9/2003 | Goldberg | H05B 1/0236 219/497 |
| 2003/0205571 | A1* | 11/2003 | Flugstad | A23B 4/01 219/497 |
| 2004/0265409 | A1* | 12/2004 | Keeley | B29B 13/023 425/143 |

FOREIGN PATENT DOCUMENTS

| | | |
|---|---|---|
| DE | 202009014331 U1 | 12/2010 |
| DE | 202013003006 U1 | 6/2013 |
| DE | 10201403729 | 2/2014 |
| EP | 1 424 530 A1 | 6/2004 |
| JP | 2010-271009 | 12/2010 |
| WO | 96/16364 | 5/1996 |

\* cited by examiner

HEATING CONTROL AND/OR REGULATION DEVICE

CROSS REFERENCE TO RELATED APPLICATIONS

The application claims the benefit of German Application No. 102014203729.8 filed on Feb. 28, 2014, which is incorporated by reference herein in its entirety.

BACKGROUND

Industrially manufactured products are often subjected to thermal treatment with the aid or heaters. Even small deviations in the thermal process can lead in such cases to an enormous adverse effect on the product quality. In order to increase the quality of a heat-treated product it is important to be able to focus the energy needed very precisely in terms of time and space. This is done with the aid of specific heating controllers and/or regulators, which guarantee a highly precise activation of heating elements. In such cases resistive loads in the form of radiant heaters, especially infrared radiant heaters, are frequently used as heating elements.

For example blow molding systems usually have radiant heater arrays to heat preforms. The radiant heaters (radiant infrared heaters) are then frequently controlled/regulated and monitored in respect of their power output by a heating control and/or regulation device supplied with electricity via a switching element connected into the power supply.

To this end the heating control and/or regulation device mostly receives set values for the heating power of the connected heating elements via a communications system, such as an open field bus of a higher-ranking control and/or regulation device for example, e.g. of a stored program controller (SPC). The set values can be present for example in the form of absolute set values, set values related to a maximum power or set values related to a nominal power. The power can relate for example to a heating power to be output or to an electric power of heating elements to be consumed. Activation signals for the switching elements are then derived from these set values in the heating control and/or regulation device with the aid of a predetermined control and/or regulation algorithm. The set values can however also be present in the form of pulse packets or percentages of half waves per unit of time (e.g. per second), from which activation signals for the switching elements can then be derived directly. The switching states of the switching elements and thus heating powers of the heating elements are then controlled or regulated via the activation signals. For simplification and for better understanding all the set values are referred to below as "set values for a heating power".

The switching elements can be activated and thus the switching state or the heating power can be controlled or regulated for example with a phase controller or a half wave controller with switching elements switching at zero power during the zero crossing. Semiconductor switches (e.g. solid-state relays) are used here as switching elements for example.

The temperature of a product to be heated is actually controlled or regulated in such cases in the higher-ranking control and/or regulation device, which has a corresponding control and/or regulation algorithm for this purpose.

To this end the higher-ranking control and/or regulation device is connected either directly or indirectly (via an input module) to a temperature measurement device for actual values of a temperature and is configured such that it detects the actual values of the temperature from this temperature measurement device and with the aid of the control and/or regulation algorithm creates set values for the heating power of the heating elements, which are then communicated by the communications system to the heating control and/or regulation device.

In a corresponding manner the higher-ranking control and/or regulation device can be connected either directly or indirectly (e.g. via analog or digital input modules) to current and/or voltage sensors for detecting additional current and/or voltage values, to analog or digital signal generators for detecting additional analog or digital signals and either directly or indirectly (e.g. via analog or digital output modules) to actuators.

The input and the output modules can in such cases be attached, as individual separate modules or grouped together in a separate module, to the heating control and/or regulation device and communicate the measured values and signals via the heating control and/or regulation device and its communication interface and via the communications system to the higher-ranking control and/or regulation device. As an alternative the input and the output modules can involve components entirely separated from the heating control and/or regulation device, each with their own communication interface to the communications system.

SUMMARY

On this basis, the heating control and/or regulation device is able to act quickly and in an autonomous manner on a heating process by having at least one additional connection for a temperature measurement device for actual values of a temperature, and by the control and/or regulation unit being configured such that it detects the actual values of the temperature from the temperature measurement device and additionally controls and/or regulates the switching state of the switching elements as a function of these actual values.

The detection and processing of the actual values of the temperature, e.g. the actual temperature of a product to be heated, as well as taking account of the values during the control and/or regulation of the switching states of the switching elements is not thus not performed, as in the related art, in the higher-ranking control and/or regulation device, but locally in situ in the heating control and/or regulation device. No communication of the actual values of the temperature from the heating control and/or regulation device to the higher-ranking control and/or regulation device and also no subsequent communication of modified set values for the heating power of the heating elements from the higher-ranking control and/or regulation device to the heating control and/or regulation device is thus necessary. This enables associated time losses to be avoided and a heating process can thus be acted on more quickly.

Because of the large degree of independence from the higher-ranking control and/or regulation device, from any separate input modules for detecting the actual values of the temperature and from a communications system between the higher-ranking control and/or regulation device and the heating control and/or regulation device, the functions of the heating control and/or regulation device are able to be maintained even in the event of faults in the higher-ranking control and/or regulation device, in input modules and/or in the communications system. Largely autonomous operation of the heating control and/or regulation device is thus possible. In this way the fault-tolerant characteristics of the heating process are also enhanced. In addition the complexity of the overall system is reduced. By comparison with the related art fewer components with corresponding space requirements and wiring outlay are accordingly needed.

In the simplest case the actual values of the temperature can be used by the control and/or regulation unit of the heating control and/or regulation device as part of the control and/or regulation, to trigger safety reactions, i.e. for example if a predetermined threshold is exceeded, to disconnect a group or all of the heating elements from the power supply. They can also be used by the control and/or regulation unit to derive new/modified set values from the set values obtained by a higher-ranking control and/or regulation device. Thus the control and/or regulation unit can for example modify received set values for a heating power of the heating element (e.g. in the form of pulse packets or percentages of half waves per unit of time) in accordance with predetermined criteria as a function of the actual values of the temperature.

In accordance with an especially advantageous embodiment the set values received by the heating control and/or regulation device via the interface are already set temperature values. A complete temperature control and/or regulation can then be integrated into the heating control and/or regulation device. This makes possible an especially rapid control and/or regulation of the actual values of the temperature to the set temperature values with at the same time the greatest possible autonomy of the heating control and/or regulation device.

In accordance with a further advantageous embodiment the device also has at least one additional connection for a current and/or voltage sensor and the control and/or regulation unit is embodied such that it detects current and/or voltage values from this current and/or voltage sensor and controls and/or regulates the switching state of the switching elements additionally as a function of these current and/or voltage values. The measured currents or voltages can for example involve currents through heating elements, voltages at heating elements, or voltages/currents of the power supply. This enables fluctuations in the power supply or changes in the electrical resistance of the heating element (e.g. in its warming-up phase) to be taken into account in the control and/or regulation of the switching states of the switching elements and thus the accuracy of the control and/or regulation to be increased. For these current and/or voltage values too the detection and processing thus occurs directly in situ in the heating control and/or regulation device and thus makes it possible to act quickly on the heating process with high autonomy and fault tolerance.

In accordance with a further advantageous embodiment the heating control and/or regulation device also has at least one additional connection for an analog or digital signal generator and the control and/or regulation unit is configured so as to detect analog or digital signals from the signal generator and to control and/or regulate the switching state of the switching elements additionally as a function of the signals. The analog or digital signals can for example involve signals from pushbuttons, switches, emergency shutdown signal generators, light barriers, potentiometers, status signals, tacho signals (pulse speeds) of fans etc. For the signals too the detection and processing is thus undertaken directly in situ in the heating control and/or regulation device and thus makes it possible to quickly act on the heating process and to have a highly safe system.

The heating control and/or regulation device may also have at least one additional connection for an output of analog or digital signals. These signals can for example serve to activate an actuator or a contactor or can be detected and evaluated by a safety monitoring device. The control and/or regulation unit is configured such that it creates these analog or digital signals as a function of the values detected via additional connections and/or analog or digital and/or the set values. In the simplest case the actuator can involve an alarm device (e.g. indicator light, warning tone generator) but also a drive or an associated activation device for fans, for a movement of heating elements or for the product to be heated. Thus, by the activation of an actuator or safety monitoring device directly in situ by the heating control and/or regulation device, it is possible to quickly act on the heating process with a high degree of autonomy and fault tolerance as well as a high degree of personal safety.

The heating control and/or regulation device may use a scheduler which logically links the values detected by the additional connections and/or analog or digital signals and/or the set values to each other and on the basis of stored logic then triggers reactions of the heating control and/or regulation device. These reactions can involve control and/or regulation functions as well as safety reactions of the heating control and/or regulation device. For example analog or digital output signals can be created or modified by such a reaction or the activation signals for the switching elements can be modified. The scheduler may be realized in the form of a state machine.

In accordance with a further advantageous embodiment the interface is embodied for connection to a communications system, especially to an open industrial field bus such as PROFIBUS for example or to an open industrial network such as PROFINET for example. This enables a link to a higher-ranking control and/or regulation device for receiving the set values to be realized in an especially simple and effortless manner.

In accordance with a further very advantageous embodiment the heating control and/or regulation device includes at least one basic module and one peripheral module, which are able to be connected to one another or disconnected from one another electrically and mechanically via an interface, wherein the peripheral module includes the additional connections, and may also include associated devices for detecting and pre-processing of measured values. A simple individual adaptation of the heating control and/or regulation device to different applications with different input variables can be undertaken via the peripheral module, whereas the basic module is the same for all applications. For this purpose a number of different standardized peripheral modules for different applications can be made available, which differ for example in the number and type of inputs, sensitivity of the inputs, signal levels and forms at the outputs, dielectric strength, resistance to short-circuits etc.

It is also possible for the heating control and/or regulation device to have a first operating mode for operation of the basic module with a peripheral module and a second operating mode for operation of the basic module without a peripheral module. In the first operating mode the heating control and/or regulation device then operates in fast local control and/or regulation mode with high autonomy in relation to a higher-ranking control and/or regulation device. In the second operating mode the heating control and/or regulation device by contrast operates with high dependence on the higher-ranking control and/or regulation device, which takes over the major control and/or regulation tasks.

Furthermore the heating control and/or regulation device can have one operating mode for operation with a higher-ranking control and/or regulation device and one operating mode for operation independent of the higher-ranking control and/or regulation device (stand-alone mode). This last operating mode can on the one hand maintain a secure operating state or bring about a transition into a secure operating state in the event of faults in the higher-ranking control and/or regulation device or in the communications system. This latter operating mode can however also be used for regular operation without a higher-ranking control and/or regulation device, if e.g. the set values are predetermined manually by an operator.

In accordance with a further advantageous embodiment the heating control and/or regulation device has a housing with a protection type of IP 65 and greater and can then even be disposed directly in situ in the field at the heating elements outside a control or switching cabinet.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
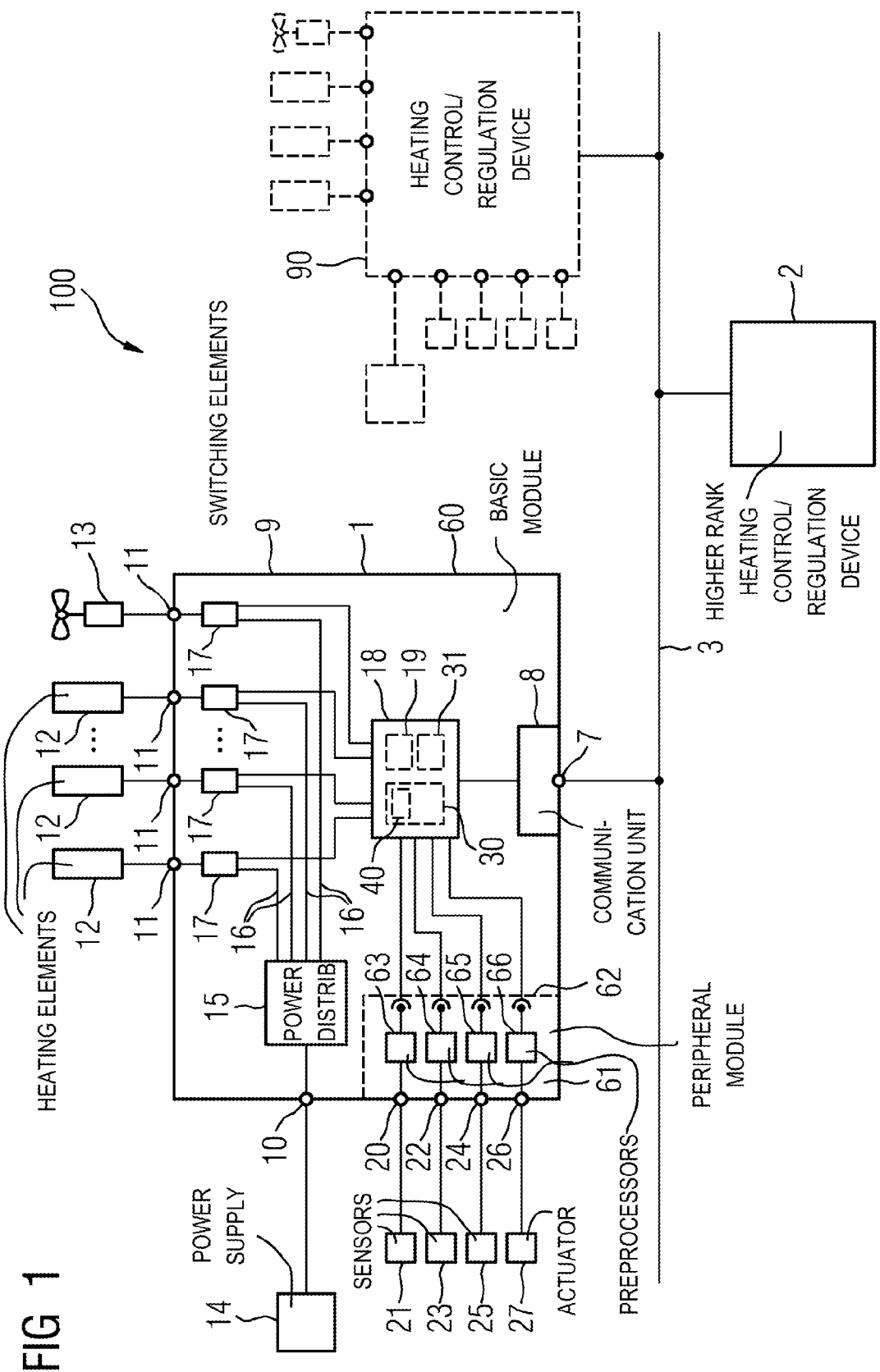
FIG. 1 is a block diagram of a first heating control and/or regulation system with a heating control and/or regulation device.

Reference will now be made in detail to the preferred embodiments, examples of which are illustrated in the accompanying drawings, wherein like reference numerals refer to like elements throughout.

A heating control and/or regulation system 100 shown in FIG. 1 includes a heating control and/or regulation device 1, a higher-ranking control and/or regulation device 2 and a communications system 3.

The heating control and/or regulation device 1 has one power input 10 and a number (e.g. nine) of power outputs 11.

One heating element 12, especially a radiant heater in each case or alternately a fan drive 13, is able to be connected electrically to each of the power outputs 11.

The power input 10 is able to be connected electrically to a power supply network 14 (e.g. with a rated voltage of 400 Vac) for the heating elements 12 or the fan drive 13.

The heating control and/or regulation device 1 also has a power distribution device 15 with power protection elements not shown in any greater detail, which is connected electrically on the input side to the power input 10 and on the output side electrically via at least one branch 16 to each of the power outputs 11, in order to supply these with electric power from the power supply network 14. Connected into each of the branches 16 is a switching element 17 in each case. In the case of a connected heating element 12 a semiconductor switch (e.g. a so-called "solid-state relay") may be used as the switching element 17 and the case of a connected fan drive 13, as an alternative an electromechanical contactor is used as the switching element.

The heating control and/or regulation device 1 is connected via a communication interface 7 to the communications system 3 and has a communication unit 8 for communication. The communications system 3 may involve an open industrial field bus such as e.g. PROFIBUS or an open industrial network such as e.g. PROFINET.

Furthermore the heating control and/or regulation device 1 has a control and/or regulation unit 18.

The control and/or regulation unit is configured such that it controls or regulates the switching state of the switching elements 17 as a function of control commands (e.g. switch-on commands, switch-off commands) and of set values for the heating power. The set values can for example be present in the form of absolute set values, of set values related to a maximum power or of set values related to a rated power. The power can relate for example to a heating power to be emitted or to an electric power to be consumed by heating elements. Activation signals for switching elements 17 will then be derived from these set values by the control and/or regulation unit 18 with the aid of a predetermined control and/or regulation algorithm 19. The set values can however also already be present in the form of pulse packets or percentages of half waves per unit of time (e.g. per second), from which activation signals can then be derived directly for the switching elements. The switching states of the switching elements 17 and thus the heating powers of the heating elements 12 are then controlled and/or regulated via the activation signals.

The switching elements 17 can be activated and thus the switching state or the heating power can be controlled and/or regulated for example with a phase controller or a half wave controller.

To this end the heating control and/or regulation device 1 receives set values and/or control commands from the higher-ranking control and/or regulation device 2 via the interface 7.

The heating control and/or regulation device 1 may have a housing 9 and the power distribution device 15, the switching elements 17, the control and/or regulation unit 18 and the communication unit 8 are integrated into the device 1, i.e. enclosed in the housing 9. The switching elements 17 can however also involve separate switching elements (i.e. not integrated into the housing), which are connected externally between a power output 11 and a heating element 12 or a fan drive 13.

The heating control and/or regulation device 1 has at least one additional connection 20 for a temperature measurement device 21 for actual values of a temperature and the control and/or regulation unit 18 is configured such that it acquires the actual values of the temperature from the temperature measurement device 21 and additionally controls and/or regulates the switching state of the switching elements 17 as a function of these actual values of the temperature.

The actual values of the temperature can be used by the control and/or regulation unit 18 of the heating control and/or regulation device 1 as part of the control and/or regulation in the simplest case to trigger safety reactions, i.e. for example to disconnect one, a group or all of the heating elements 12 from the power supply network 14 when a threshold is exceeded. The actual values of the temperature can also be used by the control and/or regulation unit 18 in order to derive new set values from the set values obtained by the higher-ranking control and/or regulation device 2. Thus the control and/or regulation unit 18 can for example modify set values for a heating power of the heating element received by the higher-ranking control and/or regulation device 2 (e.g. in the form of pulse packets or percentages of half waves per unit of time) according to predetermined criteria as a function of the actual values of the temperature (e.g. for limiting electric currents on connection of the heating elements to the power supply or for optimizing operation).

In accordance with an especially advantageous embodiment the set values received by the heating control and/or regulation device 1 via the interface 7 from the higher-ranking control and/or regulation device 2 are already set temperature values. A complete temperature control and/or regulation 30 is then integrated into the heating control and/or regulation device 1.

The detection and processing of actual values of the temperature, e.g. the actual temperature of a product to be heated, as well as taking the values into account in the control and/or regulation of the switching states of the switching elements 17 are thus performed locally in situ in the heating control and/or regulation device 1. Thus there is no communication of the current values of the temperature from the heating control and/or regulation device 1 to the higher-ranking control and/or regulation device 2 and also no subsequent communication of modified set values and if necessary control commands for the heating power of the heating elements 12 from the higher-ranking control and/or regulation device 2 to the heating control and/or regulation device 1 is necessary. This enables time losses to be avoided and an especially rapid control and/or regulation of the actual values of the temperature to the set temperature values is possible. This enables a heating process to be acted on especially quickly.

Because the higher-ranking control and/or regulation device 2 is largely independent of any special input modules for detecting the actual values of the temperature and of the communications system 3, the functions of the heating control and/or regulation device 1 can be maintained even in the event of faults in the higher-ranking control and/or regulation device 2 or in the communications system 3. A largely autonomous operation of the heating control and/or regulation device 1 is thus possible. This also enables the fault tolerance of the heating process to be increased.

Figure 2:
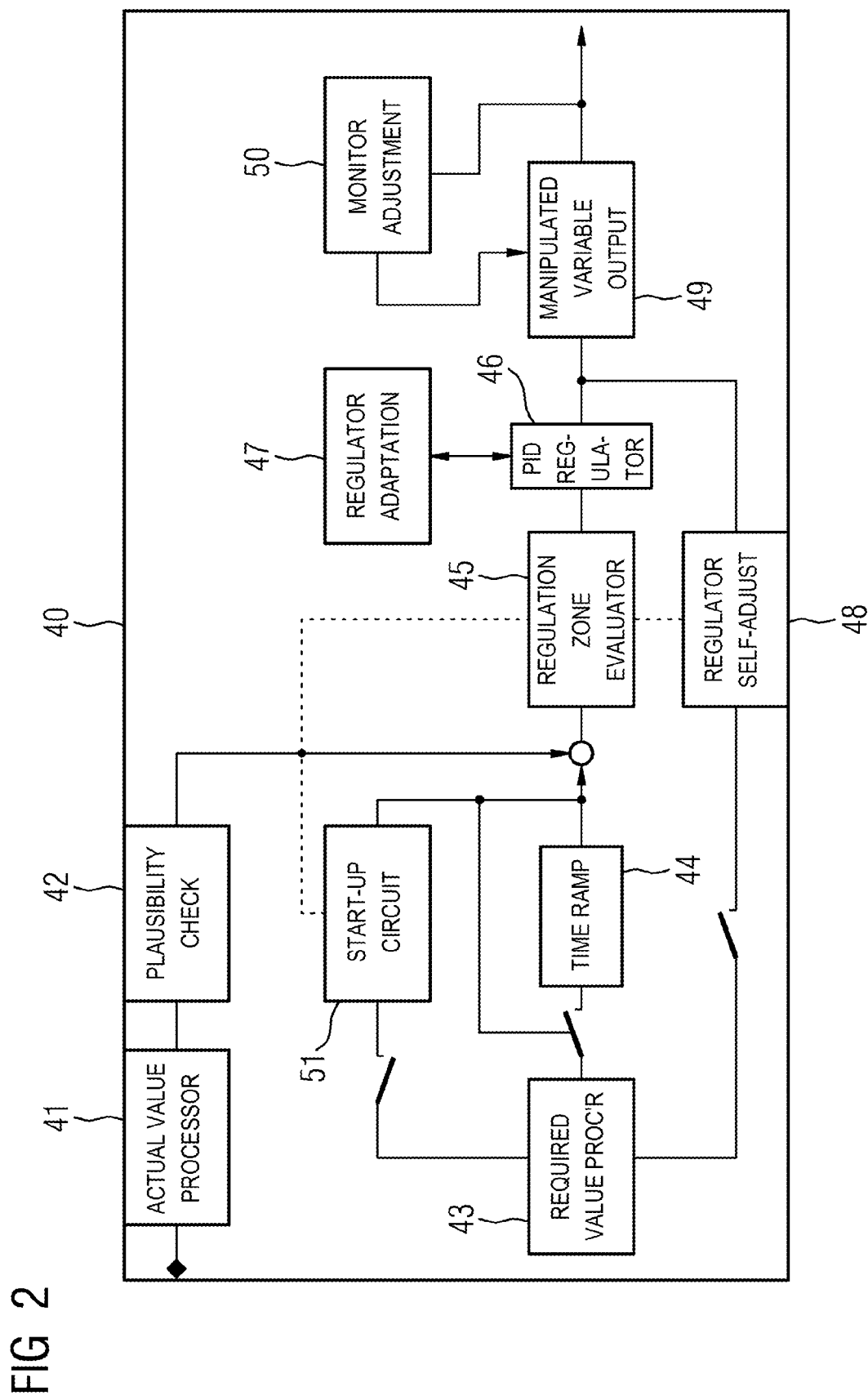
FIG. 2 is a block diagram of an exemplary embodiment for a temperature regulator and FIG. 3 is a block diagram of a second heating control and/or regulation system with a heating control and/or regulation device.

FIG. 2 shows an example of a temperature regulator 40 for regulating the temperature in the temperature controller and/or regulator 30 of the control and/or regulation unit 18. The temperature regulator 40 has an actual value processor 41 for filtering the measured and detected actual values of the temperature and a chip 42 for checking the plausibility of these actual values. A set value processor 43 determines the current set temperature value predetermined by the higher-ranking control and/or regulation device 2 and transfers it to the actual regulator. The set value can optionally be conveyed via a time ramp (loop 44) or be predetermined directly.

For the actual regulation the regulator 40 has a regulation zone evaluator 45, a PID regulator 46, a regulator adaptation 47 for improving the fault and guidance behavior through continuous adaptation of the regulation parameters and a chip 48 for self-adjustment of the regulator. A manipulated variable output 49 serves to output manipulated variables, e.g. a set value for a heating power in the form of pulse packets (pulse-pause ratios). A chip 50 serves during the manipulated variable output to monitor whether an adjustment signal also causes a corresponding reaction in the heating system. For regulation of heating channels a start-up circuit 51 is present.

The device 1 also has one further additional connection 22 for a current and/or voltage sensor 23 and the control and/or regulation unit 18 is embodied such that it detects current and/or voltage values from this current and/or voltage sensor 23 and additionally controls and/or regulates the switching state of the switching elements 17 as a function of these current and/or voltage values. The measured currents or voltages can for example involve currents through heating elements 12, voltages at heating elements 12 or voltages/currents in the power supply network 14. This enables account to be taken for example of fluctuations in the power supply or changes in the electrical resistance of the heating elements 12 (e.g. in their warming-up phase) in the control and/or regulation of the switching states of the switching elements 17 and thus the accuracy of the control and/or regulation to be enhanced.

The heating control and/or regulation device 1 also has at least one additional connection 24 for an analog or digital signal generator 25 and the control and/or regulation unit 18 is configured such that it detects analog or digital signals from this signal generator 25 and additionally controls and/or regulates the switching state of the switching elements 17 as a function of these signals. The signal generator can for example involve a pushbutton, switch, emergency-shutdown signal generator, a light barrier, a potentiometer, generator of status signals, a tacho signal generator (i.e. generator of pulse speeds) of fans etc.

The heating control and/or regulation device 1 furthermore has at least one additional connection 26 for an output of analog or digital signals and the control and/or regulation unit 18 is configured such that it creates these analog or digital signals as a function of values detected via the additional connections 20, 22, 24, analog or digital signals and/or the set values.

For example an actuator 27 is connected to the additional connection 26. In the simplest case the actuator 27 involves an alarm device (e.g. indicator light, warning tone generator) but also a drive (or an associated activation device) for a fan, for a movement of heating elements 12 or for the product to be heated. Instead of an actuator, a safety monitoring device could also be connected to the connection 26 for example.

For all these values and signals the detection and processing thus takes place directly locally in situ in the heating control and/or regulation device 1 and thus makes it possible to quickly act on the heating process with high autonomy of the device 1 and high fault tolerance of a system.

For an especially fast processing the control and/or regulation unit 18 has a scheduler 31 in the form of a state machine, which logically links the values detected via the additional connections 20, 22, 24 and/or analog or digital signals and/or the set values to one another and on the basis of a stored logic then triggers reactions of the heating control and/or regulation device 1. These reactions can involve control and/or regulation functions and also safety reactions of the heating control and/or regulation device 1. For example analog or digital signals output via the connection 26 can be created or modified through such a reaction or the activation signals for the switching element 17 can be modified.

In such cases the heating control and/or regulation device 1 includes basic module 60 and a peripheral module 61 which are able to be connected together or are able to be disconnected from one another electrically and mechanically via an interface 62. The peripheral module 61 in this case includes additional connections 20, 22, 24, 26 and associated devices 63, 64, 65, 66 for detection and pre-processing of input-side measured values and signals or for preparation and output of output-side activation signals for the actuator 27. Via the peripheral module 61 a simple adaptation of the heating control and/or regulation device 1 to different applications with different input variables and outputs can be undertaken, whereas the basic module 60 is the same for all applications. To this end a number of different standardized peripheral modules 61 can be made available for different applications, which for example differ in the number and type of inputs, sensitivity of the inputs, signal levels and forms at the outputs, dielectric strength, resistance to short-circuits etc.

To simplify the diagram, only a few additional connections are shown in FIG. 1. Fundamentally, instead of only a single connection in each case for a temperature measurement device, a current and/or voltage sensor, an analog or digital signal generator and an actuator, naturally a number of such connections can be present in each case and the control and/or regulation unit 18 can be configured accordingly for processing values and signals of all these inputs or for creating activation signals for all these outputs.

The heating control and/or regulation device 1 has a first operating mode for operating the basic module 60 with a peripheral module 61 and a second operating mode for operating the basic module 60 without a peripheral module 61. In the first operating mode the heating control and/or regulation device 1 then operates in rapid local control and/or regulation mode with high autonomy in relation to the higher-ranking control and/or regulation device 2. In the second operating mode the heating control and/or regulation device 1 on the other hand operates strongly dependent on the higher-ranking control and/or regulation device 2, which takes over the major control and/or regulation tasks, e.g. regulating a temperature.

The heating control and/or regulation device also has an operating mode for operating independently of the higher-ranking control and/or regulation device 2 (stand-alone operation). This operating mode on the one hand can maintain safe operation or bring about a transition into a safe operating state in the event of faults in the higher-ranking control and/or regulation device 2 or in the communications system 3. However this operating mode can also be used for regular operation without the higher-ranking control and/or regulation device 2, if for example the set values are predetermined manually by an operator.

The heating control and/or regulation device 1 may have a housing 9 with a protection type of IP 65 and greater and can then be disposed directly on site in the field at the heating elements 12 or also outside a control or switching cabinet.

Basically the heating control and/or regulation device 1 can also have further interfaces, e.g. further communication interfaces or power supply interfaces for internal power supply of the device 1.

The higher-ranking control and/or regulation device 2 also be used for control and/or regulation of further heating control and/or regulation devices 1 which are connected to the communications system 3. This is indicated in FIG. 1 by a further heating control and/or regulation device with the reference number 90.

Figure 3:
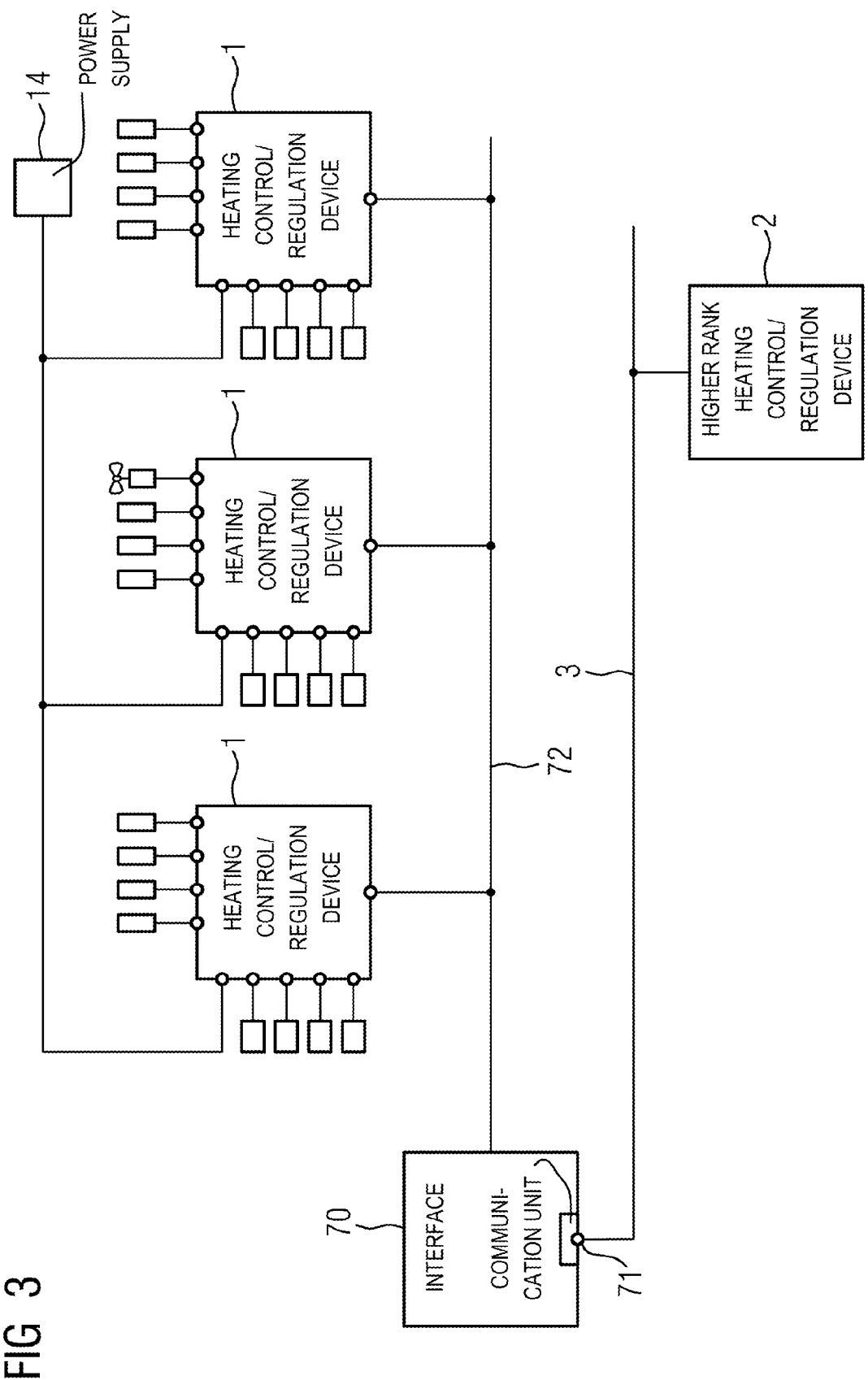

As shown in FIG. 3, a number of heating control and/or regulation devices 1 together with an interface module 70 can be combined into a modular heating control and/or regulation system. The devices 1 can then be connected to a Gammon power supply network 14. The interface module 70 serves as the central interface of the device 1 with the communications system 3 and thus for communication with the higher-ranking control and/or regulation device 2. For this purpose the interface module 70 has a communication interface 71 to the communications system 3. The individual heating control and/or regulation devices then represent power modules or power units of the system. The heating control and/or regulation devices 1 are connected with their communication interface 7 to an internal (e.g. proprietary) communications system 72 and are in communication via the system with the interface module 70. The interface module 70 receives set values and/or control commands from the higher-ranking control and/or regulation device 2 and forwards these to the devices 1.

It is also conceivable for the interface module 72 to have similar additional connections and processing options to the devices 1 or the peripheral modules 61, through which, as a function of the acquired values and signals, there can already be an influencing/modification of the set values or control commands in the interface module 70.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A heating control/regulation device using a temperature measurement device in controlling how heating elements are supplied with electricity from a power supply, comprising:
    power outputs electrically connectable to heating elements, respectively;
    a power input electrically connectable to a power supply for the heating elements;
    a power distribution device having an input electrically connectable to the power supply and outputs electrically connectable via branches to the power outputs, respectively, to supply the power outputs with electric power from the power supply;
    switching elements respectively disposed in the branches;
    a control/regulation unit configured to at least one of control and regulate a switching state of the switching elements as a function of set values for the heating power; and
    an external interface configured to receive the set values, wherein the heating control/regulation device is configured to receive via at least one connection to a temperature measurement device comprising at least one sensor, actual values of temperature and to supply the control/regulation unit with the actual values of the temperature from the temperature measurement device as the set values.

2. The heating control/regulation device as claimed in claim 1, wherein the set values are set temperature values.

3. The heating control/regulation device as claimed in claim 2, wherein at least one of a current sensor and voltage sensor is connected to the heating control/regulation device via said external interface which acquires at least one of current and voltage values from the at least one of the current sensor and voltage sensor; and
    wherein said control/regulation unit at least one of controls and regulates the switching state of the switching elements as a function of the at least one of current and voltage values.

4. The heating control/regulation device as claimed in claim 3, wherein at least one signal generator is connected to the heating control/regulation device via said external interface which receives at least one of acquired analog and digital signals from the at least one signal generator, and
wherein said control/regulation unit at least one of controls and regulates the switching state of the switching elements as a function of the at least one of acquired analog and digital signals.

5. The heating control/regulation device as claimed in claim 4,
wherein said external interface has at least one output of at least one of generated analog and digital signals, and
wherein said control/regulation unit creates the at least one of generated analog and digital signals as a function of at least one of the at least one of current and voltage values, the at least one of acquired analog and digital signals, and the set values.

6. The heating control/regulation device as claimed in claim 5, further comprising a scheduler logically linking the at least one of current and voltage values, the at least one of acquired analog and digital signals, and the set values, to one another and triggering reactions of the heating control/regulation device based on stored logic.

7. The heating control/regulation device as claimed in claim 6, wherein the external interface is connected to a communications system providing one of an open industrial field bus and an open industrial network.

8. The heating control/regulation device as claimed in claim 7, wherein the heating control/regulation device is constructed as at least one basic module and a peripheral module configured to be connected to and disconnected from one another electrically and mechanically via an internal interface, the peripheral module providing the at least one output and connections to the temperature measurement device, the at least one of the current sensor and voltage sensor, and the at least one signal generator, and corresponding devices performing acquisition and preprocessing of the actual values of temperature, the at least one of current and voltage values and the at least one of acquired analog and digital signals.

9. The heating control/regulation device as claimed in claim 8, wherein the basic module has a first operating mode with the peripheral module and a second operating mode without the peripheral module.

10. The heating control/regulation device as claimed in claim 9, wherein the basic module has a dependent operating mode for operation with a higher-ranking control/regulation device and an independent operating mode for operation independent of the higher-ranking control/regulation device.

11. The heating control/regulation device as claimed in claim 10, further comprising a housing with a protection type of at least IP 65.

12. The heating control/regulation device as claimed in claim 5, wherein the heating control/regulation device is constructed as at least one basic module and a peripheral module configured to be connected to and disconnected from one another electrically and mechanically via an internal interface, the peripheral module providing the at least one output and connections to the temperature measurement device, the at least one of the current sensor and voltage sensor, and the at least one signal generator, and corresponding devices performing acquisition and preprocessing of the actual values of temperature, the at least one of current and voltage values and the at least one of acquired analog and digital signals.

13. The heating control/regulation device as claimed in claim 12, wherein the basic module has a first operating mode with the peripheral module and a second operating mode without the peripheral module.

14. The heating control/regulation device as claimed in claim 13, wherein the basic module has a dependent operating mode for operation with a higher-ranking control/regulation device and an independent operating mode for operation independent of the higher-ranking control/regulation device.

15. The heating control/regulation device as claimed in claim 3, further comprising a scheduler logically linking the at least one of current and voltage values and the set values, to one another and triggering reactions of the heating control/regulation device based on stored logic.

16. The heating control/regulation device as claimed in claim 1, wherein at least one of a current sensor and voltage sensor is connected to the heating control/regulation device via said external interface which acquires at least one of current and voltage values from the at least one of the current sensor and voltage sensor; and
wherein said control/regulation unit at least one of controls and regulates the switching state of the switching elements as a function of the at least one of current and voltage values.

17. The heating control/regulation device as claimed in claim 1, wherein at least one signal generator is connected to the heating control/regulation device via said external interface which receives at least one of analog and digital signals from the at least one signal generator, and
wherein said control/regulation unit at least one of controls and regulates the switching state of the switching elements as a function of the at least one of analog and digital signals.

18. The heating control/regulation device as claimed in claim 1,
wherein said external interface has at least one output of at least one of analog and digital signals, and
wherein said control/regulation unit creates the at least one of analog and digital signals as a function of the set values.

19. The heating control/regulation device as claimed in claim 1, wherein the heating control/regulation device is constructed as at least one basic module and a peripheral module configured to be connected to and disconnected from one another electrically and mechanically via an internal interface, the peripheral module providing at least one output and connections to the temperature measurement device, and a corresponding device performing acquisition and preprocessing of the actual values of temperature.

20. The heating control/regulation device as claimed in claim 19, wherein the basic module has a dependent operating mode for operation with a higher-ranking control/regulation device and an independent operating mode for operation independent of the higher-ranking control/regulation device.

* * * * *